United States Patent
Bengtsson et al.

(10) Patent No.: US 10,938,603 B2
(45) Date of Patent: Mar. 2, 2021

(54) METHOD FOR A CELLULAR MULTIPLE-INPUT AND MULTIPLE-OUTPUT SYSTEM

(71) Applicant: Sony Mobile Communications Inc., Tokyo (JP)

(72) Inventors: Erik Bengtsson, Eslöv (SE); Olof Zander, Södra Sandby (SE); Basuki Priyanto, Lund (SE)

(73) Assignee: SONY CORPORATION, Tokyo (JP)

( * ) Notice: Subject to any disclaimer, the term of this patent is extended or adjusted under 35 U.S.C. 154(b) by 7 days.

(21) Appl. No.: 16/340,576

(22) PCT Filed: Oct. 10, 2016

(86) PCT No.: PCT/EP2016/074195
§ 371 (c)(1),
(2) Date: Apr. 9, 2019

(87) PCT Pub. No.: WO2018/068812
PCT Pub. Date: Apr. 19, 2018

(65) Prior Publication Data
US 2019/0296942 A1    Sep. 26, 2019

(51) Int. Cl.
*H04L 25/02* (2006.01)
*H04B 7/0417* (2017.01)
(Continued)

(52) U.S. Cl.
CPC ....... *H04L 25/0228* (2013.01); *H04B 7/0421* (2013.01); *H04L 5/005* (2013.01);
(Continued)

(58) Field of Classification Search
None
See application file for complete search history.

(56) References Cited

U.S. PATENT DOCUMENTS

| | | | |
|---|---|---|---|
| 9,002,305 B1 | 4/2015 | Nabar | |
| 2007/0121538 A1* | 5/2007 | Ode | H04L 5/0048 370/323 |

(Continued)

FOREIGN PATENT DOCUMENTS

| | | | | |
|---|---|---|---|---|
| WO | 2015114413 | 8/2015 | | |
| WO | WO-2015114039 A1 * | 8/2015 | ............ | H04W 4/029 |

(Continued)

OTHER PUBLICATIONS

PCT International Search Report and Written Opinion dated Apr. 26, 2017 for corresponding International Patent Application No. PCT/EP2016/074195 (18 pages).

*Primary Examiner* — Yaotang Wang
(74) *Attorney, Agent, or Firm* — Myers Bigel, P.A.

(57) ABSTRACT

A system is disclosed that includes a base station having a plurality of antennas a control unit which analyses pilot signals received from the terminal device at the plurality of antennas to obtain information about a wireless channel property of the wireless channel between the terminal device and the plurality of antennas. According to a method, a plurality of pilot signals is transmitted from the terminal device to the base station, and information about the wireless channel property of the wireless channel between the terminal device and the plurality of antennas of the base station is determined based on a predefined number of last recently transmitted pilot signals of the plurality of pilot signals from the terminal device. Based on the information about the wireless channel property, at least one parameter of the plurality of antennas is configured by the base station.

18 Claims, 2 Drawing Sheets

(51) Int. Cl.
  *H04L 5/00* (2006.01)
  *H04W 72/04* (2009.01)
  *H04B 7/0413* (2017.01)
(52) U.S. Cl.
  CPC ........... *H04W 72/04* (2013.01); *H04B 7/0413* (2013.01); *Y02D 30/70* (2020.08)

(56) References Cited

U.S. PATENT DOCUMENTS

2014/0307654 A1* 10/2014 Kim ..................... H04B 7/0647
  370/329
2018/0069676 A1* 3/2018 Ma ........................ H04L 5/0007

FOREIGN PATENT DOCUMENTS

WO  WO-2015114413 A1 * 8/2015 ........... H04B 17/318
WO  2015197110  12/2015

* cited by examiner

METHOD FOR A CELLULAR MULTIPLE-INPUT AND MULTIPLE-OUTPUT SYSTEM

CROSS REFERENCE TO RELATED APPLICATION

This application is a 35 U.S.C. § 371 national stage application of PCT International Application No. PCT/EP2016/074195, filed on Oct. 10, 2016, the contents of which are incorporated herein by reference in its entirety. The above-referenced PCT International Application was published in the English language as International Publication No. WO 2018/068812 A1 on Apr. 19, 2018.

FIELD OF THE INVENTION

The present invention relates to a method for a cellular multiple-input and multiple-output, MIMO, system and to devices implementing the method.

BACKGROUND OF THE INVENTION

Increasing demands in data and voice communication require to increase data transmission performance and reliability. One solution to meet these requirements is to use the so called multiple-input and multiple-output (MIMO) technology in wireless telecommunication systems for transmitting information between a base station and terminal devices of users.

MIMO systems may use multiple send and receive antennas for wireless communication at the base station as well as the terminal devices. The MIMO technology forms the basis for coding techniques which use the temporal as well as the spatial dimension for transmitting information. The enhanced coding provided in MIMO systems allows a spectral and energy efficiency of the wireless communication to be increased.

The base station may include a large number of antennas, for example several tens or even in excess of 100 antennas with associated transceiver circuitry. Systems comprising such base stations are also called massive MIMO systems. The extra antennas of the massive MIMO base station allow radio energy to be spatially focused in transmissions as well as a directional sensitive reception which improves spectral efficiency and radiated energy efficiency. Massive MIMO may be advantageous compared to beamforming (BF) as beamforming relies on phasing the antenna elements in order to obtain the beam in a certain direction. Consequently, any signal contribution outside this beam will be attenuated. In contrast to this, in a massive MIMO system, not only all or multiple beams or signals from different radiation paths are used, but they are additionally coherently combined such that a higher gain may be achieved, the so-called massive MIMO gain.

In order to adapt transmit and receive signals at each individual antenna of the base station in accordance with the currently active terminal devices, a base station logic needs information about wireless radio channel properties between the terminal device and the antennas of the base station. A pilot signalling scheme, a so-called channel sounding, is used for this purpose, which allows the base station to set configuration antenna parameters for transmitting signals, so as to focus radio energy at the terminal device or for receiving radio signals from the terminal devices. Thus, focus may mean both phase align contribution with different path lengths and transmit only in directions that will reach the terminal device. Training sequences, so-called pilot signals, may be transmitted from the terminal device in a resource which is dedicated to the terminal device. Pilot signals from different terminal devices need to be orthogonal in order for the base station to identify the configuration parameters for the plurality of antennas for each one of the terminal devices. Orthogonality may be achieved by using time division multiple access (TDMA), code division multiple access (CDMA) or frequency division multiple access (FDMA) technologies or a combination thereof.

For example, LTE (Long Term Evolution) supports both Frequency-division duplex (FDD) and Time-division duplex (TDD) modes. While FDD makes use of paired spectra for uplink (UL) and downlink (DL) transmission separated by a duplex frequency gap, TDD splits one frequency carrier into alternating time periods for transmission from the base station to the terminal device and vice versa. Both modes have their own frame structure within LTE and these are aligned with each other meaning that similar hardware can be used in the base stations and terminal devices to allow for economy of scale. The LTE transmission is structured in the time domain in radio frames. Each of these radio frames is 10 ms long and consists of 10 sub frames of 1 ms each. The Orthogonal frequency-division multiple access (OFDMA) sub-carrier spacing in the frequency domain is 15 kHz. Twelve of these sub-carriers together allocated during a 0.5 ms timeslot are called a resource block. Each resource block may contain a plurality of resource elements. A LTE terminal device can be allocated, in the downlink or uplink, a minimum of 2 resources blocks during 1 subframe (1 ms).

In case the MIMO system uses time division multiple access (TDMA) or frequency division multiple access (FDMA), each terminal device can transmit a pilot signal in an assigned time slot or frequency range, which can be received by the antennas and analysed by the base station logic. The timeslots and frequency ranges, in which terminal devices may transmit their pilot signals in combination, are also referred to as pilot portion of a transmission frame. The remaining timeslots and frequency ranges of the frame may be used for downlink (DL) and uplink (UL) data transmission. The pilot signals may each include a training sequence, and the pilot signals received at the plurality of antennas of the base station are analysed by the base station logic. Information about a radio channel property of the radio channel between the terminal device and the plurality of antennas may be obtained as a result of this analysis. A base station may use the results of the analysis to determine configuration parameters for transmitting signals via the antennas to the respective terminal devices and for receiving signals via the antennas from the respective terminal devices. In particular, based on the received uplink pilot signal configuration parameters may be obtained and transmit configuration parameters may be obtained based on reciprocity.

As the wireless radio channel property of the wireless channel between the terminal device and the base station may vary with time, the pilot signalling has to be repeated after a so-called coherence time which indicates the time duration over which the channel property is considered to be not varying. Likewise, as the transmission of payload data may use large frequency ranges, for each coherence bandwidth of the payload data transmission a corresponding pilot signal may be provided for analysing the channel properties within a coherence bandwidth. The coherence bandwidth is a statistical measurement of a range of frequencies over which the channel is considered to be "flat", or in other words the approximate maximum bandwidth over which two frequencies of a signal are likely to experience comparable or correlated amplitude fading.

Due to its spatial dimension for transmitting information, massive MIMO systems may be used in situations where a large number of users are located within a small area. On the other hand, massive MIMO may also be used for range extension, utilising the massive MIMO gain for communicating with terminal devices in large distances or with terminal devices having power amplifiers with very limited output power, for example low cost low power devices with fully integrated power amplifiers and limited output power, such as utility meters. However, although the massive MIMO gain may be advantageously used for payload transmissions, the channel sounding may raise problems as the pilot signals do not benefit from the massive MIMO gain and may therefore be hardly distinguishable from noise.

SUMMARY OF THE INVENTION

In view of the above, there is a need in the art for enhancing multiple-input and multiple-output, MIMO, systems, in particular massive MIMO systems, to enable and improve configuration of an antenna array in poor pilot signal transmission conditions.

According to the present invention, this object is achieved by the features of the independent claims. The dependent claims define embodiments of the invention.

According to the present invention, a method for a cellular multiple-input and multiple-output, MIMO, system is provided. The MIMO system comprises a first device, for example a base station of the cellular MIMO system, having a plurality of antennas and a control unit which analyses pilot signals received from a second device at the plurality of antennas to obtain information about a wireless channel property of the wireless channel between the second device and the plurality of antennas. The second device may comprise for example a terminal device operated in the cellular MIMO system. The wireless channel may comprise a radio-frequency channel assigned to the cellular MIMO system. According to the method, a plurality of pilot signals is transmitted from the second device to the first device. Information about the wireless channel property of the wireless channel between the second device and the plurality of antennas of the first device is determined based on a predefined number of last recently transmitted pilot signals of the plurality of pilot signals from the second device. In other words, for determining information about the wireless channel property, multiple pilot signals from the same terminal device are considered by the base station. In particular, a predefined number of last recently transmitted pilot signals is considered. Thus, several pilot signals of a sliding window comprising the last recently transmitted pilot signals are considered for determining information about the wireless channel property. Based on the information about the wireless channel property, at least one parameter of the plurality of antennas is configured by the first device. The predefined number of last recently received pilot signals to be considered for determining information about the wireless channel property may be at least two or may be in a range of 2 to 2000. In for example LTE (Long Term Evolution) systems, the predefined number of last recently received pilot signals to be considered may be for example 16. By considering several last recently received pilot signals, noise may be averaged and thereby attenuated and information about the wireless channel property may be determined more reliably.

In a TDMA system, the last recently transmitted pilot signals may be transmitted one after the other in several frames or even one frame. In a FDMA system, the last recently pilot signals may be transmitted simultaneously on different frequencies in one or more frames.

According to an embodiment, the last recently received pilot signals are transmitted within a coherency time and/or a coherency bandwidth. The coherency time is a time duration in which the channel property of the wireless channel is considered to be not varying. Likewise, the coherency bandwidth is a bandwidth or frequency range over which all frequencies of a signal are likely to experience comparable or correlated amplitude fading. The several pilot signals within coherence bandwidth and/or coherence time provide redundant information, but are each individually disturbed by noise. Therefore, by considering these several pilot signals, noise may be removed from the pilot signals and the wireless channel property may be determined more reliably. For example, two or more pilot signals of the predefined number of last recently transmitted pilot signals may be transmitted simultaneously from the second device to the first device. In this context, "simultaneous" may comprise a transmission at the same time, for example in case the pilot signals are transmitted at different frequencies in a LTE FDMA system, or within a common time window, for example a same transmission frame in a LTE TDMA system. Thus, the two or more pilot signals may be transmitted at least within the coherence time and/or within the coherence bandwidth.

Furthermore, the first device may vary the number of considered pilot signals thus trying different bandwidth and time windows to average over, as the pilot signals are the same. However, the thus tried bandwidths and time windows may be selected within the coherency time and/or coherency bandwidth.

According to an embodiment, an averaged pilot signal is determined by averaging the predefined number of last recently received pilot signals of the received plurality of pilot signals, and the information about the wireless channel property of the wireless channel between the second device and the plurality of antennas of the first device is determined based on the averaged pilot signal. Averaging the pilot signals may comprise a filtering of the pilot signals. For example, several pilot signals may have been transmitted in corresponding resource elements of a plurality of frames within the coherence time or even within one frame. The received pilot signals are averaged or filtered such that the noise will be attenuated while the pilot signals will be amplified versus the noise. Thus, a signal-to-noise ratio may be achieved that is large enough for processing the averaged pilot signal.

According to another embodiment, for each pilot signal of the predefined number of last recently received pilot signals, a corresponding information about the wireless channel property is determined based on the corresponding pilot signal. Furthermore, for each pilot signal of the predefined number of last recently received pilot signals, a corresponding configuration parameter for configuring the plurality of antennas is determined based on the corresponding information about the wireless channel property. Finally, the at least one parameter of the plurality of antennas is configured based on the plurality of configuration parameters, each determined for each pilot signal of the predefined number of last recently received pilot signals. For example, the at least one parameter may be configured based on an averaging of the configuration parameters or based on a filtering of the configuration parameters. For example, phase, gain and amplitude parameters may be configured for each antenna.

According to another embodiment, a movement information is determined which indicates a movement of the second device. The predefined number, which defines the number of considered last recently received pilot signals, is determined based on the movement information. The movement information may comprise for example an indication indicating whether the second device is stationary or moving, or a speed information indicating a current speed of the second device. A movement of the second device, for example a user equipment or a utility meter, may influence the coherence bandwidth as well as the coherence time. When the second device is moving, environmental conditions may vary such that the wireless radio channel properties may vary. The faster the second device is moving, the shorter the coherence time is to be expected. Likewise, a movement of the second device may influence the coherence bandwidth via Doppler spread.

According to yet another embodiment, same payload data is transmitted several times from the second device to the first device. Based on the payload data which was transmitted several times by the second device, data is determined at the first device. In other words, a certain amount of payload data, which is to be transmitted from the second device to the first device, is transmitted repeatedly several times from the second device to the first device. For example, the same payload data is transmitted four times in four consecutive frames from the second device to the first device. At the first device, the repeatedly transmitted same payload data is considered commonly, for example by correlating corresponding resources within the frames, such that the noise will average out while the payload data, which is the same in all of the frames, will then be amplified versus noise.

The number of times, with which the same payload data is transmitted by the second device, may be lower than the predefined number of last recently received pilot signals used for determining the information about the wireless channel property. In situations with low signal-to-noise ratio, transmission of pilot signals as well as payload data may be disturbed. Payload data may benefit from MIMO gain after the antenna parameters have been configured appropriately based on the pilot signals. However, the pilot signals itself do not benefit from MIMO gain such that it may be advantageous to base the antenna parameter setting on a larger number of pilot signals than the number of repeatedly transmitted payload data.

Likewise, same payload data may be transmitted several times from the first device to the second device. Based on the payload data which was transmitted several times by the first device, data is determined at the second device. At the second device, the repeatedly transmitted same payload data is considered commonly, for example by correlating corresponding resources within the frames, such that the noise will be averaged and thus attenuated while the payload data, which is the same in all of the frames, will be amplified versus noise.

The number of repeated transmissions of payload data in the direction from the first device to the second device (downlink (DL) direction) may be different from the number of repeated transmissions in the opposite direction from the second device to the first device (uplink (UL) direction). For example, the first device, for example a base station, may determine the numbers of repetitions for each direction (uplink and downlink) individually based on an analysis of the received pilot signals and may communicate the numbers of repetitions to the second device, for example a terminal device. In FDMA systems a repeated transmission of payload data may comprise a transmission of the same payload data simultaneously in different frequency bands, Furthermore, according to the present invention, a device for a cellular multiple-input and multiple-output, MIMO, system is provided. This device corresponds essentially to the first device mentioned above. The device may comprise for example a base station. The device comprises a plurality of antennas and a control unit coupled to the plurality of antennas. The control unit is configured to receive a plurality of pilot signals from a further device, for example a user equipment or a utility meter, and to determine information about a wireless channel property of a wireless channel between the further device and the plurality of antennas based on a predefined number of last recently received pilot signals of the received plurality of pilot signals. Based on the information about the wireless channel property, the control unit configures at least one parameter of the plurality of antennas. As the parameter configuration of the antennas is based on a plurality of last recently received pilot signals, a reliable configuration is enabled even in case the pilot signals are disturbed by noise, for example due to a large distance between the device and the further device or due to a low power amplifier of the further device.

The device may be configured to perform the above-described method or any one of the embodiments described above and comprises therefore the above-described advantages.

Additionally, according to the present invention, a device for a cellular multiple-input and multiple-output, MIMO, system is provided, for example a user equipment or a utility meter. This device corresponds essentially to the second device mentioned above. The device comprises an antenna and a control unit coupled to the antenna. The control unit is configured to transmit a plurality of pilot signals to a further device, for example a base station, via the antenna, and to transmit same payload data several times to the further device via the antenna. By repeatedly transmitting pilot signals as well as payload data, a reliable data communication between the device and the further device may be accomplished even in noisy environments, in case of a large distance between the device and the further device, or in case the device is capable of low power transmissions only.

The device may furthermore be configured to perform the above-described method or any one of the embodiments described above and comprises therefore also the above-described advantages.

Although specific features described in the above summary and the following detailed description are described in connection with specific embodiments and aspects of the present invention, it should be understood that the features of the exemplary embodiments and aspects may be combined with each other unless specifically noted otherwise.

BRIEF DESCRIPTION OF THE DRAWINGS

The present invention will be described in more detail with reference to the accompanying drawings.

DETAILED DESCRIPTION OF PREFERRED EMBODIMENTS

In the following, exemplary embodiments of the present invention will be described in more detail. It is to be understood that the features of the various exemplary embodiments described herein may be combined with each other unless specifically noted otherwise. Same reference signs in the various drawings refer to similar or identical components. Any coupling between components or devices shown in the figures may be a direct or indirect coupling unless specifically noted otherwise.

Figure 1:
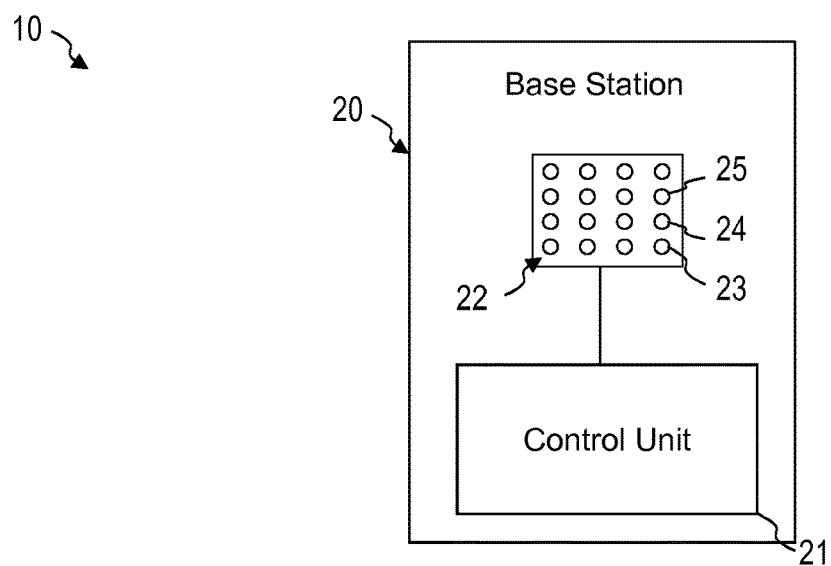
FIG. 1 shows schematically a base station and a terminal device according to embodiments of the present invention.
Figure 1:
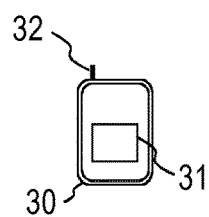

FIG. 1 shows a communication system 10 according to an embodiment. The communication system 10 is a cellular multiple-input and multiple-output (MIMO) system and includes a MIMO base station 20 and a terminal device 30. The MIMO communication system 10 may be a massive MIMO system (MaMi).

The base station 20 comprises an antenna array 22 comprising a plurality of antennas. Three of these antennas are indicated by reference signs 23 to 25. The antennas 23 to 25 may be arranged in the two-dimensional or three-dimensional spatial array on a carrier. The MIMO base station 20 may have a large number of antennas, much more antennas than shown in FIG. 1, for example several tens or even in excess of 100 antennas. The base station 20 may comprise furthermore associated (not shown) transceivers for the antennas 23 to 25. The plurality of antennas may also be spatially distributed to various locations, for example in a cooperative MIMO system. It is further possible that several base stations interact in a cooperative MIMO system, with the plurality of antennas being distributed over various locations.

In the communication system 10, a plurality of terminal devices, for example user equipment devices or utility meters, may be arranged. However, FIG. 1 shows only one exemplary terminal device 30. The terminal device 30 may be configured to communicate with the base station 20. In particular, a control unit 31 of the terminal device 30 is configured to transmit a pilot signal to the base station 20 via an antenna 32. The pilot signal may include a training sequence for sounding the wireless radio channel between the terminal device 30 and the base station 20. In particular, the pilot signal may be a MIMO pilot signal.

The base station 20 is configured to analyse the pilot signal received at the plurality of antennas 23 to 25 of the base station 20 to determine a channel characteristics for a radio signal transmission between the plurality of antennas 23 to 25 of the base station 20 and the terminal device 30. A control unit 21 of the base station 20 may be configured to determine a footprint matrix based on the pilot signal received by the plurality of antennas 23 to 25 from the terminal device 30. The control unit 21 may use the footprint matrix to control the plurality of antennas 23 to 25 when transmitting radio signals to the terminal device 30. The control unit 21 may compute a Hermitian conjugate of the footprint matrix to determine a time delay and amplitudes of radio signals transmitted by each antenna 23 to 25 to focus radio energy in a sector in which the terminal device 30 is located. When the base station 20 is receiving radio signals from the terminal device 30, the signals received at each antenna 23 to 25 are filtered, combined and/or delayed such that the radio signal from the terminal device 30 may be received with a large amplitude and large signal-to-noise ratio.

The MIMO system 10 may use a time division multiple access method (TDMA) and/or a frequency division multiple access method (FDMA) for the transmission of pilot signals and uplink and downlink data. A resource assignment for the transmission of pilot signals may be controlled by the base station 20.

Figure 2:
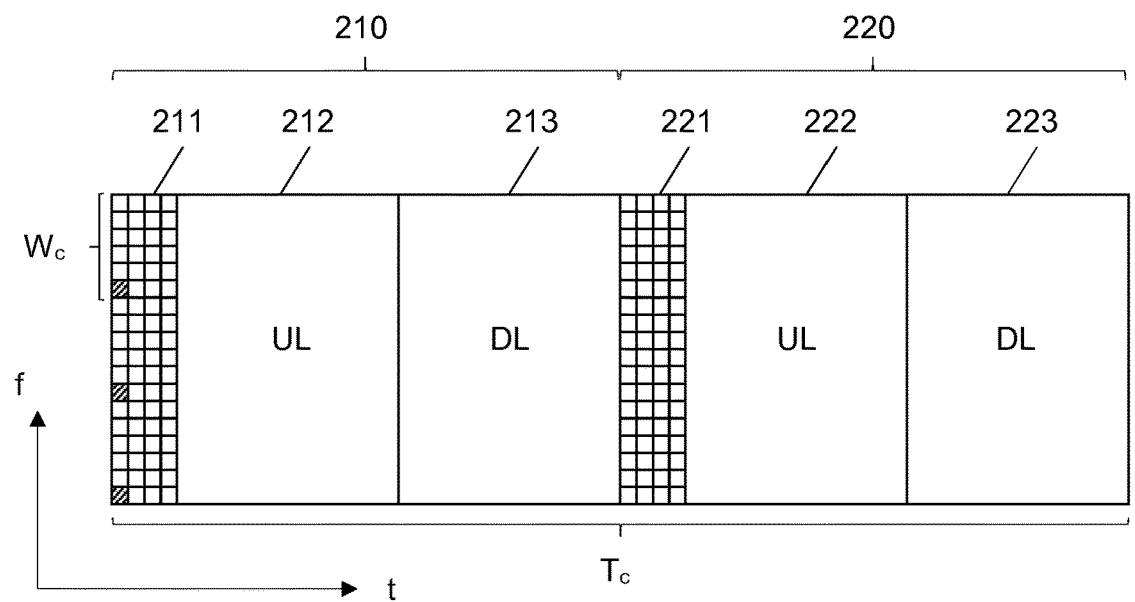
FIG. 2 shows schematically transmission frames for a MIMO system.

FIG. 2 shows schematically two MIMO frames 210 and 220 in more detail. Each frame comprises fields for the transmission of pilot signals and data. The fields are characterised by their temporal position with respect to the beginning of the frame transmission and by their frequency or frequency ranges. The MIMO frames may comprise additional fields which are not shown in FIG. 2 for clarity reasons. In detail, frame 210 comprises a pilot signal section 211, an uplink data section 212 and a downlink data section 213. Likewise, MIMO frame 220 comprises a pilot signal section 221, an uplink data section 222, and a downlink data section 223. In the example shown in FIG. 2, the pilot signal sections 211 and 221 each comprise 54 fields representing resources for transmitting pilot signals, occupying 4 timeslots and 18 frequency bands.

A coherence bandwidth Wc is assumed which covers for example six times the frequency range assigned to a pilot signal resource, that means for example the first six frequency ranges of the pilot signal sections 211 and 221 shown in FIG. 2. A coherence time Tc is assumed which covers for example two frames, that means for example the frames 210 and 220 as shown in FIG. 2. Therefore, in a typical MIMO system, the base station 20 may allocate pilot signal resources for transmitting corresponding pilot signals within the coherence bandwidth and the coherence time as indicated in FIG. 2 by the hatched areas.

Figure 3:
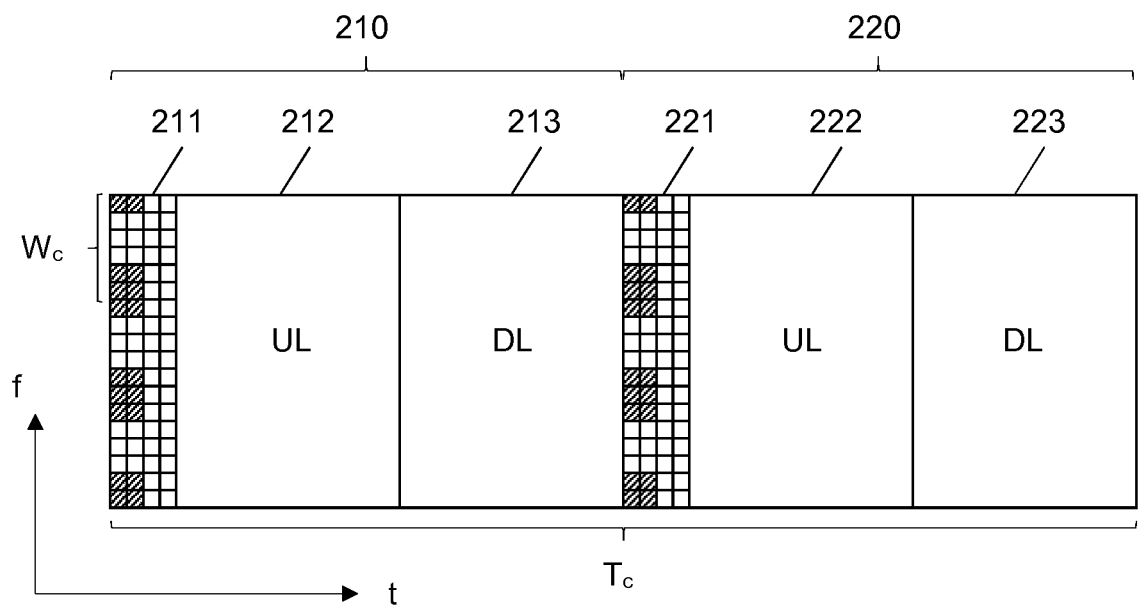
FIG. 3 shows schematically transmission frames for a MIMO system according to an embodiment of the present invention.

However, situations may occur in which pilot signals from the terminal device 30 are not received at the base station 20 with sufficient quality. For example, a terminal device 30, for example a utility meter, may be arranged far apart from the base station 20 or a power amplifier of the terminal device 30 may have a very low maximum output power. In these cases, a pilot signalling scheme as shown in FIG. 3 may be utilised. The terminal device 30 transmits a plurality of pilot signals within the coherency bandwidth We and the coherency time Tc. The plurality of pilot signals is indicated in FIG. 3 by the hatched areas. In particular, compared to FIG. 2, not only one pilot signal is transmitted within the coherency time and coherency bandwidth, but 12 pilot signals, six within the pilot signal section 221 of frame 210 and six within the pilot signal section 221 of frame 220.

At the base station 20, a predefined number of last recently received pilot signals of the plurality of pilot signals are considered for determining information about the radio channel property of the radio channel between terminal device 30 and the antennas of the base station 20. The base station 20 combines the predefined number of last recently received pilot signals, for example by averaging the received pilot signals. Thus, noise may be averaged out while the pilot signal will be amplified with respect to the noise. Doubling the number of pilot signals may ideally correspond to an increase of 3 dB in power. By considering the predefined number of last recently received pilot signals, a sliding window is moved over the received pilot signals such that the antenna parameters for the antennas 23 to 25 of the base station 20 may be adapted more reliably. Averaging over a large number of pilot signals allows an extended coverage or support of low power levels.

Figure 4:
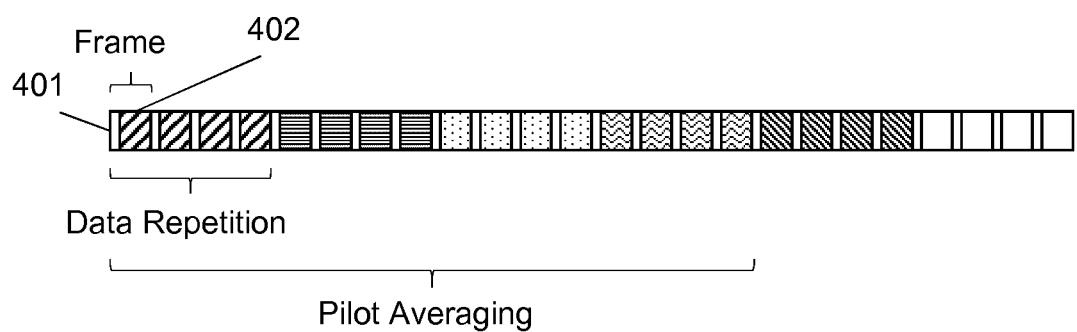
FIG. 4 shows schematically transmission frames for a MIMO system according to another embodiment of the present invention.

Dependent on the channel properties, repetition may be needed or beneficial also for data, even though the data may benefit from the massive MIMO gain. In this case, the number of repetitions may be less than for the pilot signals. Advantageously, less energy is needed in the terminal device since less repetitions are used. However, the same transmitter having a low power output may be used for transmitting pilot signals as well as uplink data. FIG. 4 shows an exemplary stream of frames having a different size for the pilot signal averaging and the data repetition. Each frame comprises a pilot signal section 401 and a data section 402. For example, the uplink data may be repeated four times and the channel is estimated based on averaging 16 pilot signals. Different rates may be standardised and communicated between the terminal device 30 and the base station 20 for link adaption. A default rate may be predefined. Furthermore, a separate repetition rate for downlink data may additionally be established. For example, the base station 20 may determine the coverage level based on a signal strength measurement of the received pilot signals and may thus determine the required number of repetitions or the window size for averaging the pilot signals. The base station 20 informs the terminal device 30 on the pilot signalling information using a downlink control channel, for example indicating a location of the pilot resources and the number of repetitions.

The invention claimed is:

1. A method for a cellular multiple-input and multiple-output, MIMO, system, the cellular MIMO system comprising a first device having a plurality of antennas and a control unit which analyzes pilot signals received from a second device at the plurality of antennas to obtain information about a wireless channel property of the wireless channel between the second device and the plurality of antennas, the method comprising:
  transmitting a plurality of pilot signals from the second device to the first device,
  determining information about the wireless channel property of the wireless channel between the second device and the plurality of antennas of the first device based on a predefined number of last recently transmitted pilot signals of the plurality of pilot signals from the second device,
  configuring, by the first device, at least one parameter of the plurality of antennas based on the information about the wireless channel property,
  transmitting same payload data several times from the second device to the first device, and
  determining, at the first device, payload data based on the payload data which was transmitted several times by the second device,
  wherein a number of times, with which the same payload data is transmitted by the second device, is lower than the predefined number of the last recently received pilot signals used for determining the information about the wireless channel property.

2. The method according to claim 1, wherein the first device comprises a base station of the cellular MIMO system, and the second device comprises a terminal device operated in the cellular MIMO system.

3. The method according to claim 1, wherein the predefined number of last recently received pilot signals is at least 2.

4. The method according to claim 1, wherein the predefined number of last recently received pilot signals is in a range of 2 to 2000 pilot resources.

5. The method according to claim 1, wherein the last recently received pilot signals are transmitted within at least one of:
  a coherency time (Tc), in which the wireless channel property of the wireless channel is considered to be not varying, and
  a coherency bandwidth (Wc) over which frequencies of a signal are likely to experience comparable or correlated amplitude fading.

6. The method according to claim 1, wherein at least two pilot signals of the predefined number of last recently transmitted pilot signals are transmitted simultaneously from the second device to the first device.

7. The method according to claim 1, wherein determining the information about the wireless channel property comprises:
  determining an averaged pilot signal by averaging the predefined number of last recently received pilot signals of the received plurality of pilot signals from the second device, and
  determining the information about the wireless channel property of the wireless channel between the second device and the plurality of antennas of the first device based on the averaged pilot signal.

8. The method according to claim 1, wherein configuring, by the first device, the at least one parameter of the plurality of antennas comprises:
  determining, for each pilot signal of the predefined number of last recently received pilot signals, a corresponding configuration parameter based on the information about the wireless channel property determined based on the corresponding pilot signal, and
  configuring the at least one parameter based on the configuration parameters.

9. The method according to claim 1, further comprising:
  determining a movement information indicating a movement of the second device, and
  determining the predefined number of last recently transmitted pilot signals, which is to be considered to determine information about the wireless channel property, based on the movement information.

10. The method according to claim 9, wherein the movement information comprises at least one of a group comprising:
  an indication indicating whether the second device is stationary or moving,
  speed information indicating a current speed of the second device.

11. A device for a cellular multiple-input and multiple-output, MIMO, system, the device comprising:
  a plurality of antennas, and
  a control unit coupled to the plurality of antennas and configured to
    receive a plurality of pilot signals from a further device,
    determine information about a wireless channel property of a wireless channel between the further device and the plurality of antennas based on a predefined number of last recently received pilot signals of the received plurality of pilot signals from the further device, and
    configure at least one parameter of the plurality of antennas based on the information about the wireless channel property,
    receive same payload data several times from the further device, and
    determining payload data based on the same payload data that was received several times, wherein a number of times, with which the same payload data is received, is lower than the predefined number of the last recently received pilot signals used to determine the information about the wireless channel property.

12. The device according to claim 11, wherein the device comprises a base station of the cellular MIMO system, and the further device comprises a terminal device operated in the cellular MIMO system.

13. The device according to claim 11, wherein the predefined number of last recently received pilot signals is at least 2.

14. The device according to claim 11, wherein the predefined number of last recently received pilot signals is in a range of 2 to 2000 pilot resources.

15. A device for a cellular multiple-input and multiple-output, MIMO, system, the device comprising:
an antenna, and
a control unit coupled to the antenna and configured to
transmit a plurality of pilot signals to a further device via the antenna, the further device being configured to determine information about a wireless channel property of a wireless channel between the further device and a plurality of antennas based on a predefined number of last recently received pilot signals of the transmitted plurality of pilot signals and to configure at least one parameter of the plurality of antennas based on the information about the wireless channel property, and
transmit same payload data several times to the further device via the antenna, the further device being configured to determine payload data based on the same payload data which was transmitted several times,
wherein a number of times, with which the same payload data is transmitted, is lower than the predefined number of the last recently received pilot signals used to determine the information about the wireless channel property.

16. The device according to claim 15, wherein the further device comprises a base station of the cellular MIMO system, and the device comprises a terminal device operated in the cellular MIMO system.

17. The device according to claim 15, wherein the predefined number of last recently received pilot signals is at least 2.

18. The device according to claim 15, wherein the predefined number of last recently received pilot signals is in a range of 2 to 2000 pilot resources.

* * * * *

UNITED STATES PATENT AND TRADEMARK OFFICE
CERTIFICATE OF CORRECTION

| | |
|---|---|
| PATENT NO. | : 10,938,603 B2 |
| APPLICATION NO. | : 16/340576 |
| DATED | : March 2, 2021 |
| INVENTOR(S) | : Bengtsson et al. |

It is certified that error appears in the above-identified patent and that said Letters Patent is hereby corrected as shown below:

In the Specification

Column 8, Line 25: Please correct "We" to read -- Wc --

Signed and Sealed this
Fifth Day of July, 2022

Katherine Kelly Vidal
*Director of the United States Patent and Trademark Office*